(12) United States Patent  
Newton et al.

(10) Patent No.: US 10,257,493 B2
(45) Date of Patent: Apr. 9, 2019

(54) TRANSFERRING OF 3D IMAGE DATA

(75) Inventors: Philip S. Newton, Eindhoven (NL); Gerardus W. T. Van Der Heijden, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 144 days.

(21) Appl. No.: 13/145,283

(22) PCT Filed: Jan. 13, 2010

(86) PCT No.: PCT/IB2010/050130
§ 371 (c)(1), (2), (4) Date: Jul. 19, 2011

(87) PCT Pub. No.: WO2010/084437
PCT Pub. Date: Jul. 29, 2010

(65) Prior Publication Data
US 2011/0279645 A1    Nov. 17, 2011

(30) Foreign Application Priority Data

Jan. 20, 2009   (EP) .................................... 09150939

(51) Int. Cl.
*H04N 13/00*   (2018.01)
*H04N 13/178*  (2018.01)
(Continued)

(52) U.S. Cl.
CPC ......... *H04N 13/178* (2018.05); *H04N 13/161* (2018.05); *H04N 13/167* (2018.05);
(Continued)

(58) Field of Classification Search
CPC ........... H04N 13/0048; H04N 13/0051; H04N 13/0059; H04N 2213/003; H04N 13/007; H04N 13/0438; H04N 13/0066
(Continued)

(56) References Cited

U.S. PATENT DOCUMENTS 4,979,033 A    12/1990  Stephens
6,441,818 B1 *  8/2002  Kurose ........................ 345/422
(Continued)

FOREIGN PATENT DOCUMENTS

EP    1026636 A2    8/2000
EP    1705929 A1    9/2006
(Continued)

OTHER PUBLICATIONS

Newton et al. "Opportunities for 3D on Blu-ray Disc". 2008 Digest of Technical Papers—International Conference on Consumer Electronics, pp. 1-2.*
(Continued)

*Primary Examiner* — Zhihan Zhou

(57) ABSTRACT

A system of transferring of three dimensional (3D) image data is described. A 3D source device (10) provides 3D display signal (56) for a display (13) via a high speed digital interface like HDMI. The 3D display signal has frames constituting the 3D image data according to a 3D video transfer format, in which format the frames comprise at least two different frame types. Each frame has a data structure for representing a sequence of digital image pixel data, and represents a partial 3D data structure. The 3D source device includes frame type synchronization indicators in the 3D display signal. The display detects the frame type synchronization indicators and frame types, and generates the display control signals based on synchronizing the partial 3D data structures in dependence of the frame type synchronization indicators.

21 Claims, 4 Drawing Sheets

(51) Int. Cl.
  *H04N 13/341* (2018.01)
  *H04N 13/167* (2018.01)
  *H04N 13/194* (2018.01)
  *H04N 13/183* (2018.01)
  *H04N 13/161* (2018.01)

(52) U.S. Cl.
  CPC ......... *H04N 13/183* (2018.05); *H04N 13/194* (2018.05); *H04N 13/341* (2018.05); *H04N 2213/003* (2013.01)

(58) Field of Classification Search
  USPC ....................................................... 348/43, 51
  See application file for complete search history.

(56) References Cited

U.S. PATENT DOCUMENTS

| | | | |
|---|---|---|---|
| 6,570,565 | B1 | 5/2003 | Park |
| 7,589,761 | B2 | 9/2009 | Kim |
| 7,970,255 | B2 | 6/2011 | Koda et al. |
| 2003/0053797 | A1 | 3/2003 | Oshima |
| 2006/0013490 | A1* | 1/2006 | Sun ................................ 382/232 |
| 2006/0238613 | A1* | 10/2006 | Takayama et al. .............. 348/47 |
| 2006/0259646 | A1 | 11/2006 | Lee et al. |
| 2007/0008575 | A1* | 1/2007 | Yu ........................ H04N 13/004 358/1.15 |
| 2007/0247477 | A1* | 10/2007 | Lowry et al. ................. 345/629 |
| 2007/0296859 | A1* | 12/2007 | Suzuki .......................... 348/473 |
| 2010/0171812 | A1* | 7/2010 | Kim et al. ...................... 348/43 |
| 2010/0238267 | A1* | 9/2010 | Izzat et al. ...................... 348/43 |

FOREIGN PATENT DOCUMENTS

| | | |
|---|---|---|
| JP | 2006005418 A | 1/2006 |
| JP | 2007336518 A | 12/2007 |
| WO | 199732437 A1 | 9/1997 |
| WO | 2006016735 A1 | 2/2006 |
| WO | WO 2008115222 A1 * | 9/2008 |
| WO | WO 2008150111 A1 * | 12/2008 |

OTHER PUBLICATIONS

Fehn, Christoph, "Depth-Image-Based Rendering (DIBR), Compression and Transmission for a New Approach on 3D-TV", 2004.
VESA (Video Electronics Standards Association) Display Port Standard, Version 1, Revision A1, Jan. 11, 2008.
International Standard ISO/IEC 23002-3 MPEG Video Technolgies, Oct. 15, 2007.

* cited by examiner

| | |
|---|---|
| InfoFrame Type code | InfoFrame Type number |
| InfoFrame version Number | Version |
| Length | Length of frame |
| Data Byte 1 | F17 |
| : | |
| : | |
| Data Byte 4 | F47 |
| : | |
| Data Byte 6 | Stereoscopic signalling version = 0x01 |
| Data Byte 7 | Stereoscopic video format |
| Data Byte 8 | Stereoscopic sync signal \| Reserved |
| Data Byte 9 | Stereoscopic Offset or Min Parallax |
| Data Byte 10 | Stereoscopic Factor or Max Parallax |
| Data Byte 11 | OSD/Subtitles present \| Reserved |
| Data Byte 12 | OSD/subtitles location line start LSb |
| Data Byte 13 | OSD/subtitles location line start MSb |
| Data Byte 14 | OSD/subtitles location line end LSb |
| Data Byte 15 | OSD/subtitles location line end MSb |
| Data Byte 16 | OSD/subtitles location pixel number start LSb |
| Data Byte 17 | OSD/subtitles location pixel number start MSb |
| Data Byte 18 | OSD/subtitles location pixel number end LSb |
| Data Byte 19 | OSD/subtitles location pixel number end MSb |
| Data Byte 20-27 | Rendering parameters |

FIG. 4

| Value | Meaning |
|---|---|
| 0 | No stereo video present |
| 1 | Field sequential stereo, right image on sync |
| 2 | Field sequential stereo, left image on sync |
| 3 | 2-way line interleaved, right image on evenlines |
| 4 | 2-way line interleaved, left image on even lines |
| 5 | 4 way interleaved stereo |
| 6 | Side-by-side interleaved stereo |
| 7 | Autostereoscopic side-by-side |
| 8 | Autostereoscopic Quadrant |
| 9-255 | Reserved |

FIG. 5

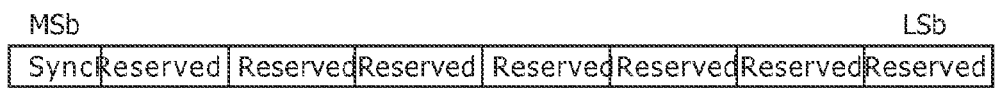

| MSb | | | | | | | LSb |
|---|---|---|---|---|---|---|---|
| Sync | Reserved | Reserved | Reserved | Reserved | Reserved | Reserved | Reserved |

FIG. 6

| Value | Meaning |
|---|---|
| 0 | No OSD /subtitles |
| 1 | OSD |
| 2 | Subtitles |
| 3 | OSD + subtitles |
| 4 | Subtitles in black bar at the Top |
| 5 | Subtitles in black bar at the Bottom |
| 6 | Closed caption present |
| 7 | |
| 8 | |
| 9-255 | |

FIG. 7

TRANSFERRING OF 3D IMAGE DATA

FIELD OF THE INVENTION

The invention relates to a method of transferring of three dimensional (3D) image data, the method comprising, at a 3D source device, processing source image data to generate a 3D display signal, the 3D display signal comprising frames constituting the 3D image data according to a 3D video transfer format, in which format the frames comprise at least two different frame types, and outputting the 3D display signal; and, at a 3D display device, displaying the 3D image data on a 3D display, receiving the 3D display signal, and detecting the different frame types in the received 3D display signal, and generating display control signals for rendering the 3D image data on the 3D display based on the different frame types.

The invention further relates to the above mentioned 3D source device, the 3D display signal and the 3D display device.

The invention relates to the field of transferring, via a high-speed digital interface, e.g. HDMI, three-dimensional image data, e.g. 3D video, for display on a 3D display device.

BACKGROUND OF THE INVENTION

Devices for sourcing 2D video data are known, for example video players like DVD players or set top boxes which provide digital video signals. The source device is to be coupled to a display device like a TV set or monitor. Image data is transferred from the source device via a suitable interface, preferably a high-speed digital interface like HDMI. Currently 3D enhanced devices for sourcing three dimensional (3D) image data are being proposed. Similarly devices for display 3D image data are being proposed. For transferring the 3D video signals from the source device to the display device new high data rate digital interface standards are being developed, e.g. based on and compatible with the existing HDMI standard. Transferring 2D digital image signals to the display device usually involves sending the video pixel data frame by frame, which frames are to be displayed sequentially. Such frames may either represent video frames of a progressive video signal (full frames) or may represent video frames of an interlaced video signal (based on the well known line interlacing, one frame providing the odd lines and the next frame providing the even lines to be displayed sequentially).

The document U.S. Pat. No. 4,979,033 describes an example of traditional video signal having an interlaced format. The traditional signal includes horizontal and vertical synchronization signals for displaying the lines and frames of the odd and even frames on a traditional television. A stereoscopic video system and method are proposed that allow synchronization of stereoscopic video with a display that uses shutter glasses. The odd and even frames are used to transfer respective left and right images of a stereoscopic video signal. The proposed 3D display device comprises a traditional envelope detector to detect the traditional odd/even frames but instead generates display signals for left and right LCD display units. In particular equalization pulses occurring during the vertical blanking interval, which differ for odd and even frames in the traditional interlaced analog video signal, are counted to identify the respective left or right field. The system uses this information to synchronize a pair of shutter glasses, such that the shutter glasses alternately open and close in sync with the stereo video.

SUMMARY OF THE INVENTION

The document U.S. Pat. No. 4,979,033 provides an example of a display device where two 3D frame types (left/right) are detected based on the existing horizontal line synchronization pulses in the traditional analog video signal. However, in particular for interlaced video signals, there are no options for manipulating the horizontal line synchronization pulses. A problem that occurs with current systems as mentioned above is that there is no absolute synchronization of the left and right video frames with the shutter glasses. The synchronization is relative. What this means in practice is that often the left and right images are swapped so that the left eye sees the images intended for the right eye and vice versa. Normally this is no problem as a 3D CAD designer, a professional user, will quickly notice this and swap left and right in the source device, usually a PC.

We have found that naïve users of a stereoscopic 3D system as described in the prior art do not properly recognize when the left and right images are swapped. This can be very problematic as this can lead to severe eye strain and even nausea. If such a system were widely employed now it would cause confusion amongst consumers and severely hinder adoption of the technology. Hence the known 3D display signal cannot be used for transferring various digital 3D image signals for consumer use.

It is an object of the invention to provide a more flexible and reliable system for transferring of 3D video signals to a display device.

For this purpose, according to a first aspect of the invention, in the method as described in the opening paragraph, each frame has a data structure for representing a sequence of digital image pixel data, and each frame type represents a partial 3D data structure, and the method comprises, at the 3D source device, including at least one frame type synchronization indicator in the 3D display signal; and said detecting comprises retrieving the frame type synchronization indicator from the 3D display signal, and said generating the display control signals is based on synchronizing the partial 3D data structures in dependence of the frame type synchronization indicator.

For this purpose, according to a second aspect of the invention, the 3D source device for transferring of 3D image data to a 3D display device as described in the opening paragraph, comprises generating means for processing source image data to generate a 3D display signal, the 3D display signal comprising frames constituting the 3D image data according to a 3D video transfer format, in which format the frames comprise at least two different frame types, and output interface means for outputting the 3D display signal, wherein each frame has a data structure for representing a sequence of digital image pixel data, and each frame type represents a partial 3D data structure, and the device comprises transmit synchronization means for including at least one frame type synchronization indicator in the 3D display signal for, at the display device, generating display control signals based on synchronizing the partial 3D data structures in dependence of the frame type synchronization indicator.

For this purpose, according to a further aspect of the invention, the 3D display device data as described in the opening paragraph, comprises a 3D display for displaying 3D image data, input interface means for receiving a 3D display signal, the 3D display signal comprising frames constituting the 3D image data according to a 3D video transfer format, in which format the frames comprise at least two different frame types, and detection means for detecting the different frame types in the received 3D display signal, and processing means for generating display control signals for rendering the 3D image data on the 3D display based on the different frame types, wherein each frame has a data structure for representing a sequence of digital image pixel data, and each frame type represents a partial 3D data structure, and the detection means are arranged for retrieving the frame type synchronization indicator from the 3D display signal, and the processing means are arranged for generating the display control signals based on synchronizing the partial 3D data structures in dependence of the frame type synchronization indicator.

For this purpose, according to a further aspect of the invention, the 3D display signal for transferring of 3D image data to a 3D display device as described in the opening paragraph, comprises frames constituting the 3D image data according to a 3D video transfer format, in which format the frames comprise at least two different frame types, wherein each frame has a data structure for representing a sequence of digital image pixel data, and each frame type represents a partial 3D data structure, and the 3D display signal comprises at least one frame type synchronization indicator for generating display control signals based on synchronizing the partial 3D data structures in dependence of the frame type synchronization indicator.

The measures have the effect that the 3D display signal is structured as a sequence of frames, whereas the individual frames have different types as indicated by the frame type synchronization indicator. Advantageously the display signal maintains the basic structure of 2D display signal while at the same time allowing transferring a range of different frame types each embodying partial 3D data structures that are combined in the receiving 3D display device to generate the display control signals based on the frame function and timing as indicated by the frame type synchronization indicator. The frame type synchronization indicator does not perform relative synchronization but instead achieves absolute synchronization. This prevents users from having to determine whether the left and right images are swapped The invention is also based on the following recognition. All legacy analog and digital display interface signals inherently are designed for directly generating display control signals, like the horizontal line synchronization pulses and frame sequences described above. Hence the signal itself dictates the timing and generation of the display control signals, whereas the function of each subsequent frame is implicit by its location in the signal. The traditional display unit does not process the image data but strictly follows the display interface signal. The inventors have seen that for 3D display signals there is a need for constituting the final 3D display control signals in the display device itself, because the various display type signals and viewer conditions and settings cannot be optimally achieved if the components of the 3D image data are combined, by the source device, in a predefined fixed way in the interface signal. Hence in the new 3D display signal various components are transferred separately in frames of different frame types. Subsequently the inventors have seen that, when transferring partial 3D data structures by different frame types, the process of detecting the different frame types and the process of combining the partial data structures, which takes place in the display device, is still to be controlled by the transmitter source device. Thereto the inventors provided the frame type synchronization indicator that is now included in the 3D display signal.

In an embodiment of the system the different frame types in the 3D video transfer format comprise at least one of a left frame type; a right frame type; a two dimensional [2D] frame type; a depth frame type; a transparency frame type; an occlusion frame type; a combination frame type indicative of a combination of sub-frames of said frame types; and the frame type synchronization indicator comprises frame type indicators corresponding to said frame types for synchronizing in time each of the 3D partial data structures from the respective frame types in the 3D video transfer format for generating the 3D display control signals. It is to be noted the above mentioned 2D frame type may be a center frame type, and the left and right frame types are also 2D frame types that may be used in combination with e.g. a depth frame or an occlusion frame type, and that many other combinations of the above frame types may effectively be employed to transfer 3D image data. The effect is that the various 3D video formats, which may range from a basic combination of left and right frame types for stereoscopic images, to complex 3D formats having a combination of left, right, depth, occlusion and transparency frames, are synchronized via the respective frame type synchronization indicators.

In an embodiment of the system the 3D video transfer format comprises a main video and at least one additional video layer transferred via respective frame types and the frame type synchronization indicator comprises at least one of a main frame type indicator and an additional layer frame type indicator. The effect is that the respective layers can be combined in any convenient way in the display device, while the combined image still maintains the correct timing relationship between the layers due to the frame type synchronization indicator. Advantageously the additional layer may comprise subtitles or graphical information like a menu or on screen display (OSD) generated in the source device, which can be combined with the main video information according to the capabilities of the display device.

In an embodiment of the system the frame type synchronization indicator comprises a 3D video format indicator indicative of the 3D video transfer format in a subsequent section of the 3D display signal. Advantageously such general 3D format indicator allows sudden changes of the video stream like jumps or mode changes in the source device to be immediately followed by the display device.

In an embodiment of the system the frame type synchronization indicator comprises a frame sequence indicator indicative of a frequency of at least one frame type and/or an order of the different frame types. The effect is that different frame types may be multiplexed at different frame frequencies and/or in a predefined order, while the respective order or sequence is detectable in the display device. Hence the display device will be aware of the sequence of frames that will be transferred, and can adjust the processing resources accordingly.

Further preferred embodiments of the method, 3D devices and signal according to the invention are given in the appended claims, disclosure of which is incorporated herein by reference.

BRIEF DESCRIPTION OF THE DRAWINGS

These and other aspects of the invention will be apparent from and elucidated further with reference to the embodiments described by way of example in the following description and with reference to the accompanying drawings, in which FIG. 4 shows a table of an AVI-info frame extended with a frame type synchronization indicator, FIG. 5 shows a Table of 3D video formats, FIG. 6 shows a frame synchronization signal, and FIG. 7 shows values for additional video layers.

In the Figs., elements which correspond to elements already described have the same reference numerals.

DETAILED DESCRIPTION OF EMBODIMENTS

Figure 1:
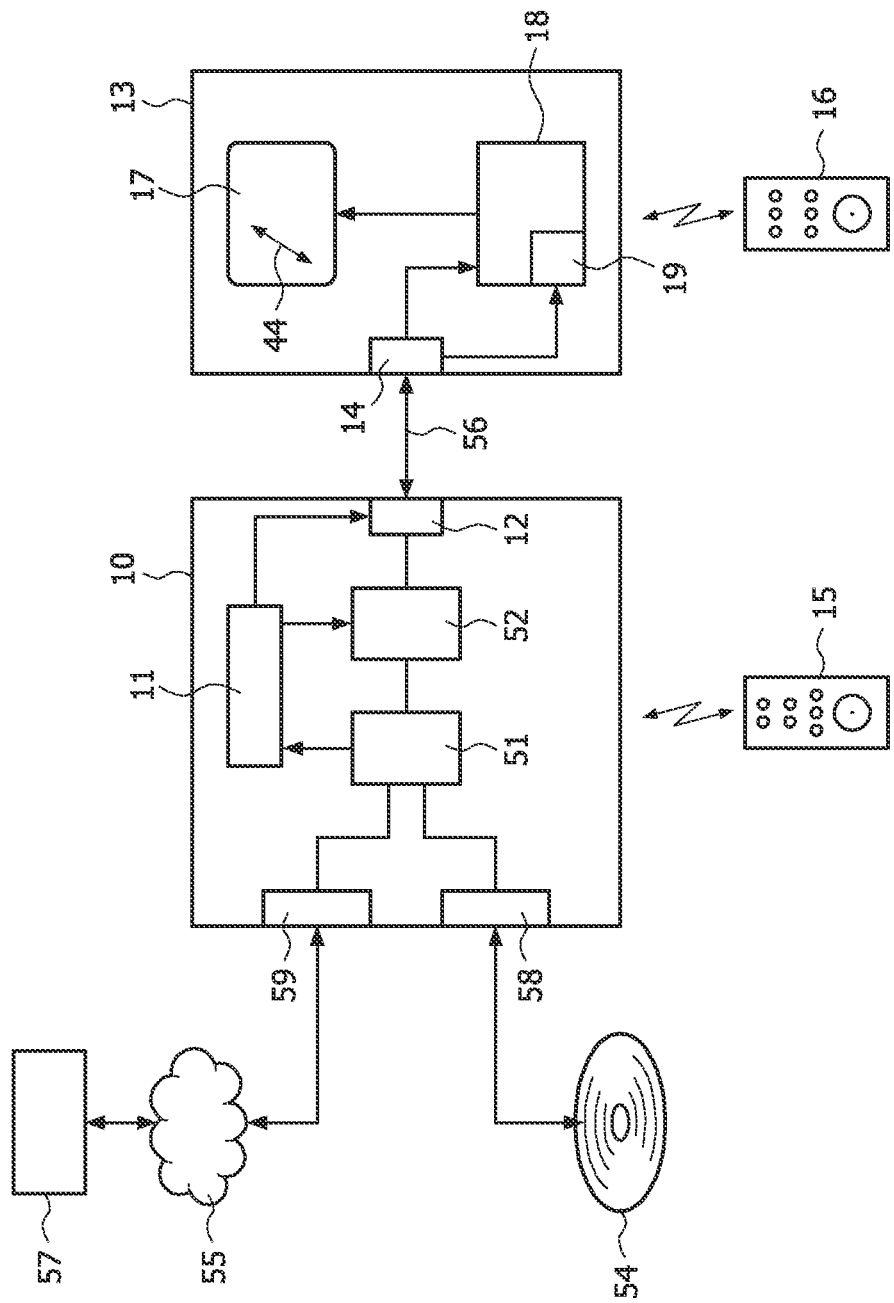
FIG. 1 shows a system for transferring three dimensional (3D) image data.

FIG. 1 shows a system for transferring three dimensional (3D) image data, such as video, graphics or other visual information. A 3D source device 10 is coupled to a 3D display device 13 for transferring a 3D display signal 56. The 3D source device has an input unit 51 for receiving image information. For example the input unit device may include an optical disc unit 58 for retrieving various types of image information from an optical record carrier 54 like a DVD or BluRay disc. Alternatively, the input unit may include a network interface unit 59 for coupling to a network 55, for example the internet or a broadcast network, such device usually being called a set-top box. Image data may be retrieved from a remote media server 57. The source device may also be a satellite receiver, or a media server directly providing the display signals, i.e. any suitable device that outputs a 3D display signal to be directly coupled to a display unit.

The 3D source device has a processing unit 52 coupled to the input unit 51 for processing the image information for generating a 3D display signal 56 to be transferred via an output interface unit 12 to the display device. The processing unit 52 is arranged for generating the image data included in the 3D display signal 56 for display on the display device 13. The source device is provided with user control elements 15, for controlling display parameters of the image data, such as contrast or color parameter. The user control elements as such are well known, and may include a remote control unit having various buttons and/or cursor control functions to control the various functions of the 3D source device, such as playback and recording functions, and for setting said display parameters, e.g. via a graphical user interface and/or menus.

The source device has a transmit synchronization unit 11 for providing at least one frame type synchronization indicator in the 3D display signal, which indicator is included in the 3D display signal in the output interface unit 12, which is further arranged for transferring the 3D display signal with the image data and the frame type synchronization indicators from the source device to the display device as the 3D display signal 56. The 3D display signal comprises a sequence of frames constituting the 3D image data according to a 3D video transfer format, in which format the frames comprise at least two different frame types. Each frame has a data structure for representing a sequence of digital image pixel data, usually arranged as a sequence of horizontal lines of a number of pixels according to a predetermined resolution. Each frame type represents a partial 3D data structure. For example the 3D partial data structures in the frame types of the 3D video transfer format may be left and right images, or a 2D image and additional depth, and/or further 3D data such as occlusion or transparency information as discussed below. Note that the frame type may also be a combination frame type indicative of a combination of sub-frames of the above frame types, e.g. 4 sub-frames having a lower resolution located in a single full resolution frame. Also a number of multi-view images may be encoded in the video stream of frames to be simultaneously displayed.

The 3D display device 13 is for displaying 3D image data. The device has an input interface unit 14 for receiving the 3D display signal 56 including the 3D image data in frames and the frame type synchronization indicators transferred from the source device 10. Each frame has a data structure for representing a sequence of digital image pixel data, and each frame type represents a partial 3D data structure. The display device is provided with further user control elements 16, for setting display parameters of the display, such as contrast, color or depth parameters. The transferred image data is processed in processing unit 18 according to the setting commands from the user control elements and generating display control signals for rendering the 3D image data on the 3D display based on the different frame types. The device has a 3D display 17 receiving the display control signals for displaying the processed image data, for example a dual LCD. The display device 13 is a stereoscopic display, also called 3D display, having a display depth range indicated by arrow 44. The display of 3D image data is performed in dependence of the different frames each providing a respective partial 3D image data structure.

The display device further includes a detection unit 19 coupled to the processing unit 18 for retrieving the frame type synchronization indicator from the 3D display signal and for detecting the different frame types in the received 3D display signal. The processing unit 18 is arranged for generating the display control signals based on the various types of image data as defined by the partial 3D data structures of the respective 3D video format, e.g. a 2D image and a depth frame. The respective frames are recognized and synchronized in time as indicated by the respective frame type synchronization indicators.

The frame type synchronization indicators allow detecting which of the frames must be combined to be displayed at the same time, and also indicate the frame type so that the respective partial 3D data can be retrieved and processed. The 3D display signal may be transferred over a suitable high speed digital video interface such as the well known HDMI interface (e.g. see "High Definition Multimedia Interface Specification Version 1.3a of Nov. 10, 2006).

FIG. 1 further shows the record carrier 54 as a carrier of the 3D image data. The record carrier is disc-shaped and has a track and a central hole. The track, constituted by a series of physically detectable marks, is arranged in accordance with a spiral or concentric pattern of turns constituting substantially parallel tracks on an information layer. The record carrier may be optically readable, called an optical disc, e.g. a CD, DVD or BD (Blue-ray Disc). The information is represented on the information layer by the optically detectable marks along the track, e.g. pits and lands. The track structure also comprises position information, e.g. headers and addresses, for indication the location of units of information, usually called information blocks. The record carrier 54 carries information representing digitally encoded image data like video, for example encoded according to the MPEG2 or MPEG4 encoding system, in a predefined recording format like the DVD or BD format.

It is noted that a player may support playing various formats, but not be able to transcode the video formats, and a display device may be capable of playing a limited set of video formats. This means there is a common divider what can be played. Note that, dependent on the disc or the content, the format may change during playback/operation of the system. Real-time synchronization of format needs to take place, and real-time switching of formats is provided by the frame type synchronization indicator.

The following section provides an overview of three-dimensional displays and perception of depth by humans. 3D displays differ from 2D displays in the sense that they can provide a more vivid perception of depth. This is achieved because they provide more depth cues then 2D displays which can only show monocular depth cues and cues based on motion.

Monocular (or static) depth cues can be obtained from a static image using a single eye. Painters often use monocular cues to create a sense of depth in their paintings. These cues include relative size, height relative to the horizon, occlusion, perspective, texture gradients, and lighting/shadows. Oculomotor cues are depth cues derived from tension in the muscles of a viewers eyes. The eyes have muscles for rotating the eyes as well as for stretching the eye lens. The stretching and relaxing of the eye lens is called accommodation and is done when focusing on an image. The amount of stretching or relaxing of the lens muscles provides a cue for how far or close an object is. Rotation of the eyes is done such that both eyes focus on the same object, which is called convergence. Finally motion parallax is the effect that objects close to a viewer appear to move faster than objects further away.

Binocular disparity is a depth cue which is derived from the fact that both our eyes see a slightly different image. Monocular depth cues can be and are used in any 2D visual display type. To re-create binocular disparity in a display requires that the display can segment the view for the left- and right eye such that each sees a slightly different image on the display. Displays that can re-create binocular disparity are special displays which we will refer to as 3D or stereoscopic displays. The 3D displays are able to display images along a depth dimension actually perceived by the human eyes, called a 3D display having display depth range in this document. Hence 3D displays provide a different view to the left- and right eye.

3D displays which can provide two different views have been around for a long time. Most of these were based on using glasses to separate the left- and right eye view. Now with the advancement of display technology new displays have entered the market which can provide a stereo view without using glasses. These displays are called auto-stereoscopic displays.

A first approach is based on LCD displays that allow the user to see stereo video without glasses. These are based on either of two techniques, the lenticular screen and the barrier displays. With the lenticular display, the LCD is covered by a sheet of lenticular lenses. These lenses diffract the light from the display such that the left- and right eye receive light from different pixels. This allows two different images one for the left- and one for the right eye view to be displayed.

An alternative to the lenticular screen is the Barrier display, which uses a parallax barrier behind the LCD and in front the backlight to separate the light from pixels in the LCD. The barrier is such that from a set position in front of the screen, the left eye sees different pixels then the right eye. The barrier may also be between the LCD and the human viewer so that pixels in a row of the display alternately are visible by the left and right eye. A problem with the barrier display is loss in brightness and resolution but also a very narrow viewing angle. This makes it less attractive as a living room TV compared to the lenticular screen, which for example has 9 views and multiple viewing zones.

A further approach is still based on using shutter-glasses in combination with high-resolution beamers that can display frames at a high refresh rate (e.g. 120 Hz). The high refresh rate is required because with the shutter glasses method the left and right eye view are alternately displayed. For the viewer wearing the glasses perceives stereo video at 60 Hz. The shutter-glasses method allows for a high quality video and great level of depth.

The auto stereoscopic displays and the shutter glasses method do both suffer from accommodation-convergence mismatch. This does limit the amount of depth and the time that can be comfortable viewed using these devices. There are other display technologies, such as holographic- and volumetric displays, which do not suffer from this problem. It is noted that the current invention may be used for any type of 3D display that has a depth range.

Image data for the 3D displays is assumed to be available as electronic, usually digital, data. The current invention relates to such image data and manipulates the image data in the digital domain. The image data, when transferred from a source, may already contain 3D information, e.g. by using dual cameras, or a dedicated preprocessing system may be involved to (re-)create the 3D information from 2D images. Image data may be static like slides, or may include moving video like movies. Other image data, usually called graphical data, may be available as stored objects or generated on the fly as required by an application. For example user control information like menus, navigation items or text and help annotations may be added to other image data.

There are many different ways in which stereo images may be formatted, called a 3D image format. Some formats are based on using a 2D channel to also carry the stereo information. For example the left and right view can be interlaced or can be placed side by side and above and under. These methods sacrifice resolution to carry the stereo information. Another option is to sacrifice color, this approach is called anaglyphic stereo. Anaglyphic stereo uses spectral multiplexing which is based on displaying two separate, overlaid images in complementary colors. By using glasses with colored filters each eye only sees the image of the same color as of the filter in front of that eye. So for example the right eye only sees the red image and the left eye only the green image.

A different 3D format is based on two views using a 2D image and an additional depth image, a so called depth map, which conveys information about the depth of objects in the 2D image. The format called image+depth is different in that it is a combination of a 2D image with a so called "depth", or disparity map. This is a gray scale image, whereby the gray scale value of a pixel indicates the amount of disparity (or depth in case of a depth map) for the corresponding pixel in the associated 2D image. The display device uses the disparity, depth or parallax map to calculate the additional views taking the 2D image as input. This may be done in a variety of ways, in the simplest form it is a matter of shifting pixels to the left or right dependent on the disparity value associated to those pixels. The paper entitled "Depth image based rendering, compression and transmission for a new approach on 3D TV" by Christoph Fen gives an excellent overview of the technology (see http://iphome.hhi.de/fehn/Publications/fehn_EI2004.pdf).

Figure 2:
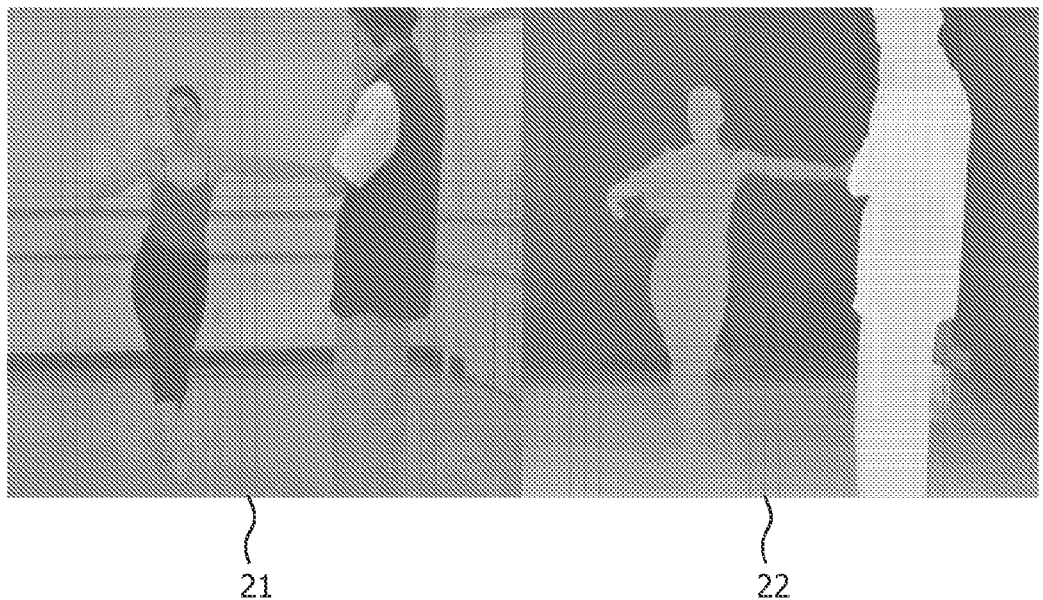
FIG. 2 shows an example of 3D image data.

FIG. 2 shows an example of 3D image data. The left part of the image data is a 2D image 21, usually in color, and the right part of the image data is a depth map 22. The 2D image information may be represented in any suitable image format. The depth map information may be an additional data stream having a depth value for each pixel, possibly at a reduced resolution compared to the 2D image. In the depth map grey scale values indicate the depth of the associated pixel in the 2D image. White indicates close to the viewer, and black indicates a large depth far from the viewer. A 3D display can calculate the additional view required for stereo by using the depth value from the depth map and by calculating required pixel transformations. Occlusions may be solved using estimation or hole filling techniques. Additional frames may be included in the data stream, e.g. further added to the image and depth map format, like an occlusion map, a parallax map and/or a transparency map for transparent objects moving in front of a background.

Adding stereo to video also impacts the format of the video when it is sent from a player device, such as a Blu-ray disc player, to a stereo display. In the 2D case only a 2D video stream is sent (decoded picture data). With stereo video this increases as now a second stream must be sent containing the second view (for stereo) or a depth map. This could double the required bitrate on the electrical interface. A different approach is to sacrifice resolution and format the stream such that the second view or the depth map are interlaced or placed side by side with the 2D video.

FIG. 2 shows an example of 2D data and a depth map. The depth display parameters that are sent to the display to allow the display to correctly interpret the depth information. Examples of including additional information in video are described in the ISO standard 23002-3 "Representation of auxiliary video and supplemental information" (e.g. see ISO/IEC JTC1/SC29/WG11 N8259 of July 2007). Depending on the type of auxiliary stream the additional image data consists either of 4 or two parameters. The frame type synchronization indicator may comprise a 3D video format indicator indicative of the respective 3D video transfer format in a subsequent section of the 3D display signal. This allows to indicate or change the 3D video transfer format, or to reset the transfer sequence or to set or reset further synchronization parameters.

In an embodiment the frame type synchronization indicator includes a frame sequence indicator indicative of a frequency of at least one frame type. Note that some frame types allow a lower frequency of transmission without substantial deterioration of the perceived 3D image, for example the occlusion data. Furthermore, an order of the different frame types may be indicated as a sequence of different frames types to be repeated.

In an embodiment the frame type synchronization indicator includes a frame sequence number. Individual frames may also be provided with the frame sequence number. The sequence number is incremented regularly, e.g. when all frames constituting a single 3D image have been send and the following frames belong to a next 3D image. Hence the number is different for every synchronization cycle, or may change only for a larger section. Hence when a jump is performed the set of frames having the same respective sequence number must be transferred before the image display can be resumed. The display device will detect the deviating frame sequence number and will only combine a complete set of frames. This prevents that after a jump to a new location an erroneous combination of frames is used.

When adding graphics on video, further separate data streams may be used to overlay the additional layers in the display unit. Such layer data is included in different frame types, which are separately marked by adding respective frame type synchronization indicators in the 3D display signal as discussed in detail below. The 3D video transfer format now comprises a main video and at least one additional video layer transferred via respective frame types and the frame type synchronization indicator comprises at least one of a main frame type indicator and an additional layer frame type indicator. The additional video layer may, for example, be subtitles or other graphical information like a menu or any other on screen data (OSD).

The frame type synchronization indicator may comprise, for the additional video layer, layer signaling parameters. The parameters may be indicative of at least one of type and/or format of additional layer;
location of display of the additional layer with respect to display of the main video;
size of display of the additional layer;
time of appearance, disappearance and or duration of display of the additional layer;
additional 3D display settings or 3D display parameters.

Further detailed examples are discussed below.

Figure 3:
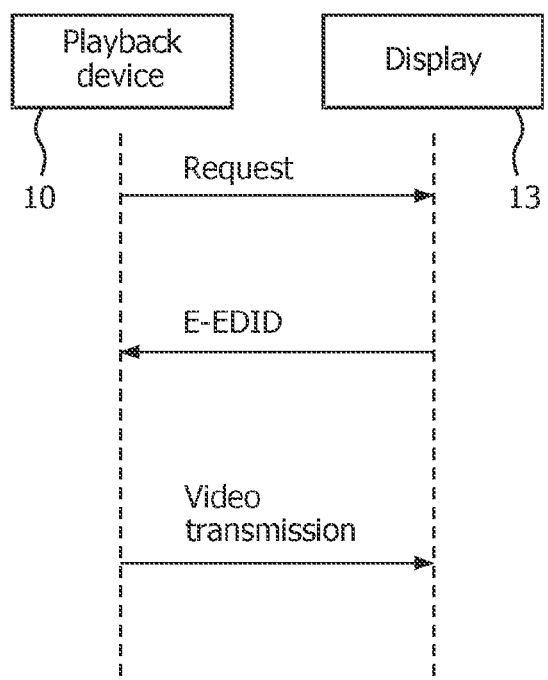
FIG. 3 shows playback device and display device combination.

FIG. 3 shows playback device and display device combination. The player 10 reads the capabilities of the display 13 and adjusts the format and timing parameters of the video to send the highest resolution video, spatially as well as temporal, that the display can handle. In practice a standard is used called EDID. Extended display identification data (EDID) is a data structure provided by a display device to describe its capabilities to an image source, e.g. a graphics card. It enables a modern personal computer to know what kind of monitor is connected. EDID is defined by a standard published by the Video Electronics Standards Association (VESA). Further refer to VESA DisplayPort Standard Version 1, Revision 1a, Jan. 11, 2008 available via http://www.vesa.org/.

The EDID includes manufacturer name, product type, phosphor or filter type, timings supported by the display, display size, luminance data and (for digital displays only) pixel mapping data. The channel for transmitting the EDID from the display to the graphics card is usually the so called $I^2C$ bus. The combination of EDID and $I^2C$ is called the Display Data Channel version 2, or DDC2. The 2 distinguishes it from VESA's original DDC, which used a different serial format. The EDID is often stored in the monitor in a memory device called a serial PROM (programmable read-only memory) or EEPROM (electrically erasable PROM) that is compatible with the $I^2C$ bus.

The playback device sends an E-EDID request to the display over the DDC2 channel. The display responds by sending the E-EDID information. The player determines the best format and starts transmitting over the video channel. In older types of displays the display continuously sends the E-EDID information on the DDC channel. No request is send. To further define the video format in use on the interface a further organization (Consumer Electronics Association; CEA) defined several additional restrictions and extensions to E-EDID to make it more suitable for use with TV type of displays. The HDMI standard (referenced above) in addition to specific E-EDID requirements supports identification codes and related timing information for many different video formats. For example the CEA 861-D standard is adopted in the interface standard HDMI. HDMI defines the physical link and it supports the CEA 861-D and VESA E-EDID standards to handle the higher level signaling. The VESA E-EDID standard allows the display to indicate whether it supports stereoscopic video transmission and in what format. It is to be noted that such information about the capabilities of the display travels backwards to the source device. The known VESA standards do not define any forward 3D information that controls 3D processing in the display.

In an embodiment the frame type synchronization indicator in the 3D display signal is transferred asynchronously, e.g. as a separate packet in a data stream while identifying the respective frame to which it relates. The packet may include further data for frame accurately synchronizing with the video, and may be inserted at an appropriate time in the blanking intervals between successive video frames. In a practical embodiment the frame type synchronization indicator is inserted in packets within the HDMI Data Islands.

An example of including the frame synchronization indicator in Auxiliary Video Information (AVI) as defined in HDMI in an audio video data (AV) stream is as follows. The AVI is carried in the AV-stream from the source device to a digital television (DTV) Monitor as an Info Frame. If the source device supports the transmission of the Auxiliary Video Information (AVI) and if it determines that the DTV Monitor is capable of receiving that information, it shall send the AVI to the DTV Monitor once per VSYNC period. The data applies to the next full frame of video data.

It is proposed to use the black bar information in AVI-Info frames to accommodate the frame type synchronization indicator, e.g. for left-right signaling and additional information for proper rendering of 3D video in the display. The AVI-info frame is a data block that is sent at least every two fields. Because of this reason it is the only info frame that can transmit signaling on a frame basis which is a requirement if it is to be used for synchronization of the stereoscopic video signal. The advantage of this solution compared to other solutions that rely on relative signaling or that rely on vendor specific info-frames is that it is compatible with current chipsets for HDMI and that it provides frame accurate synchronization and sufficient room (8 bytes) for signaling.

In an alternative embodiment it is proposed to use the preamble bits as defined in HDMI to signal that the video data that follows is a left- or a right video frame. HDMI chapter 5.2.1.1 defines that immediately preceding each Video Data Period or Data Island Period is the Preamble. This is a sequence of eight identical Control characters that indicate whether the upcoming data period is a Video Data Period or is a Data Island. The values of CTL0, CTL1, CTL2, and CTL3 indicate the type of data period that follows. The remaining Control signals, HSYNC and VSYNC, may vary during this sequence. The preamble currently is 4 bits, CTL0, CTL1 CTL3 and CTL4. At the moment only 1000 and 1010 as values are used. For example the values 1100 or 1001 may now be defined to indicate that the video data contains either a left or a right video frame, or alternatively frames that contain the image and/or depth information. Also the preamble bits may only indicate a 3D frame type or a first 3D frame of a sequence, while the further discrimination of frame types may be according to a frame type synchronization sequence defined by a further data frame. Also, the HSYNC and VSYNC signaling may be adapted to convey at least part of the frame type synchronization, e.g. whether a frame is left or a right video frame. The HSYNC is arranged to precede video data of a left frame and the VSYNC a right frame of video information. The same principle may be applied to other frame types like 2D image and depth information.

FIG. 4 shows a table of an AVI-info frame extended with a frame type synchronization indicator. The AVI-info frame is defined by the CEA and is adopted by HDMI and other video transmission standards to provide frame signaling on color and chroma sampling, over- and underscan and aspect ratio. Additional information has been added to embody the frame type synchronization indicator, as follows.

The last bit of data byte 1; F17 and the last bit of data byte 4; F47 are reserved in the standard AVI-info frame. In an embodiment of the frame type synchronization indicator these are used to indicate presence of stereoscopic signaling in the black-bar information. The black bar information is normally contained in Data byte 6 to 13. Bytes 14-27 are normally reserved in HDMI and therefore might not be correctly transmitted with current hardware. Therefore these fields are used to provide less critical OSD location information. The syntax of the table is as follows. If F17 is set (=1) then the data byte through to 13 contains 3D parameter information. Default case is when F17 is not set (=0) which means there is no 3D parameter information.

Data bytes 12 through 19 indicate the location of the OSD/subtitle overlay. The additional layer may be smaller than the main video layer, and is positioned based on the location data of bytes 12-19. This enables the 3D display to perform specific rendering on the area of the screen indicated by the frame type synchronization indicator. The frame type synchronization indicator may further include synchronization timing information for indicating when the subtitles/OSD information must appear and/or disappear, e.g. in the data bytes 20-27 called Rendering parameters in FIG. 4.

FIG. 5 shows a Table of 3D video formats. The values that are in the left column each indicate a specific video format having respective different frame types. The selected value is included in the frame synchronization indicator, for example Data Byte 7 in the Table of FIG. 4. Data Byte 7 describes the stereoscopic video format that the source (player) is transmitting. The Table of FIG. 5 lists some of the possible values. Value 0 indicates that the associated frame is 2D, this is useful when transmitting segments of 2D video during a 3D title. The display device (3D-TV) may adapt his internal image processing to this change of 3D video format, for instance switch off temporal upconversion in case of frame sequential format.

FIG. 6 shows a frame synchronization signal. The synchronization signal may be included in the frame synchronization indicator, for example Data Byte 8 in FIG. 4. Data byte 8 carries the stereo sync signal, while FIG. 6 shows the format of the sync signal. The sync signal indicates together with the video format the content of the video frame.

The values of data byte 9 and 10 in FIG. 4 depend on the video format. For example for (auto-)stereoscopic video they indicate the maximum and minimum parallax of the video content. Alternatively, they may indicate the offset and scaling factor of the "depth" information. In case of higher bit accuracy requirement (i.e. 10-bit depth) additional registers could be used to store the lower bits.

FIG. 7 shows values for additional video layers. The video format may be extended by allowing to separately include frames for additional layers like subtitles or menus (On Screen Data OSD) in the 3D video signal. In FIG. 4 Data byte 11 may indicate the presence of subtitles or OSD overlay. FIG. 7 shows a number of video format parameter values for indicating the additional layers. The remaining bytes 20-27 in FIG. 4 may be used to provide specific parameters to indicate information for scaled depth and occlusion information related to 3D displays.

It is to be noted that the invention may be implemented in hardware and/or software, using programmable components. A method for implementing the invention has the processing steps corresponding to the transferring of 3D image data elucidated with reference to FIG. 1. Although the invention has been mainly explained by embodiments using optical record carriers or the internet, the invention is also suitable for any image interfacing environment, like a 3D personal computer [PC] display interface, or 3D media center PC coupled to a wireless 3D display device.

It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software, and a processor may fulfill the function of one or more units, possibly in cooperation with hardware elements. Further, the invention is not limited to the embodiments, and lies in each and every novel feature or combination of features described above.

The invention claimed is:

1. A method of transferring 3D video data:
    creating a video stream comprising:
        a plurality of first sets of frames, wherein each first set of frames of the plurality of first set of frames comprises:
            a first information frame, wherein the first information frame comprises a first frame type identifier; and
            a first 3D display signal, wherein the first 3D signal comprises a plurality of first image data frames, wherein the first image data frames corresponds to a first single 3D image, wherein the first single 3D image is in a first format, wherein the first format corresponds to the first frame type identifier; and
        a plurality of second sets of frames, each second set of frames comprising:
            a second information frame, wherein the second information frame comprises a second frame type identifier; and
            a second 3D display signal, wherein the second 3D signal comprises a plurality of second image data frames, wherein the first image data frames corresponds to a second single 3D image, wherein the second single 3D image is in a second format, wherein the second format corresponds to the second frame type identifier;
        wherein the first frame type identifier is different than the second frame type identifier,
        wherein the first format is different than the second format,
        wherein at least one of the first or second frame type identifiers comprises a frame sequence indicator, wherein the frame sequence indicator is indicative of a frequency of the corresponding first or second image data frames comprising the first or second single 3D image;
    communicating the video stream to a 3D display device that is configured to process the video stream by repeatedly:
        decoding a next information frame to determine a determined frame type identifier;
        determining a determined format corresponding to the determined frame type identifier;
        decoding a next plurality of image data corresponding to a next single 3D image in the determined format; and
        displaying the next 3D image.

2. The method of claim 1, wherein the created video stream further comprises:
    a plurality of third sets of frames, each third set of frames comprising:
        a third information frame, wherein the third information frame comprises a third frame type identifier; and
        a 2D display signal, wherein the 2D display signal comprises a 2D image data frame corresponding to a single 2D image, wherein the single 2D image is in a third format, wherein the first format corresponds to the third frame type identifier,
    wherein the third frame type identifier is different from the first and the second frame type identifiers.

3. The method of claim 1, wherein the first frame type identifier comprises display parameters that affect the display of the 3D image at the 3D display device.

4. The method of claim 1, wherein at least one first frame type identifier comprises a main frame type identifier, wherein the main frame type identifier corresponds to the first format and an additional frame type indicator, wherein the additional frame type identifier corresponds to an additional format, and wherein the corresponding set of frames includes an additional display signal, wherein the additional display signal comprises at least one additional image data frame, wherein the at least one additional image data frame corresponds to an additional image in the additional format corresponding to the additional frame type indicator.

5. The method of claim 4, wherein the additional image data frame comprises at least one of graphical information and subtitles.

6. The method of claim 4, wherein the additional frame type identifier includes display parameters, wherein the display parameters are indicative of at least one of:
    a location of display of the additional image with respect to first image data frames;
    a size of display of the additional image; and
    a duration of display of the additional image.

7. The method of claim 1, wherein the first frame type identifier comprises a frame sequence number.

8. A 3D source device comprising:
    a processor circuit that:
        receives first 3D image data of a first frame type;
        creates a video stream, wherein the video stream comprises a plurality of first sets of frames, wherein each first set of frames of the plurality of first sets of frames corresponds to each first 3D image in the first 3D image data, and wherein each first set of frames comprises:
            a first information frame, wherein the first information frame comprises a first frame type identifier, wherein the first frame type identifier identifies the first frame type; and
            a first 3D display signal, wherein the first 3D display signal comprises a plurality of first image data frames, wherein the plurality of first image data frames corresponds to the first 3D image in a first format corresponding to the first frame type identifier;
        receives second 3D image data of a second frame type, wherein the second frame type is different from the first frame type;
        appends to the video stream a plurality of second sets of frames, wherein each second set of frames of the plurality of second sets of frames corresponds to each second 3D image in the second 3D image data, and wherein each second set of frames comprises:

a second information frame, wherein the second information frame comprises a second frame type identifier, wherein the second frame type identifier identifies the second frame type; and
a second 3D display signal, wherein the second 3D display signal comprises a plurality of second image data frames, wherein the plurality of second image data frames corresponds to the second 3D image in a second format corresponding to the second frame type identifier,
wherein the second frame type identifier is different from the first frame type identifier,
wherein at least one of the first or second frame type identifiers comprises a frame sequence indicator, wherein the frame sequence indicator is indicative of a frequency of the corresponding first or second image data frames comprising the first or second single 3D image;
wherein the second format is different than the first format; and
an output interface circuit, wherein the output interface circuit outputs the video stream.

9. The 3D source device of claim 8, wherein the processor appends to the video stream:
a plurality of third sets of frames, wherein each third set of frames of the plurality of third sets of frames comprises:
a third information frame, wherein the third information frame comprises a third frame type identifier, wherein the third frame type identifier is different from the first and second frame type identifiers; and
a 2D display signal, wherein the 2D display signal comprises a 2D image data frame, wherein the 2D image data frame corresponds to a single 2D image in a third format corresponding to the third frame type identifier.

10. The 3D source device of claim 8, wherein the first frame type identifier comprises display parameters, wherein the display parameters affect the display of the 3D image at a 3D display device.

11. The 3D source device of claim 8, wherein at least one first frame type identifier comprises a main frame type identifier, wherein the main frame type identifier corresponds to the first format and an additional frame type indicator, wherein the additional frame type indicator corresponds to an additional format, and wherein the corresponding set of frames include an additional display signal, wherein the additional display signal comprises at least one additional image data frame, wherein the additional image data frame corresponds to an additional image in the additional format corresponding to the additional frame type indicator.

12. The 3D source device of claim 11, wherein the additional image data frame comprises at least one of graphical information and subtitles.

13. The 3D source device of claim 11, wherein the additional frame type identifier includes display parameters, wherein the display parameters are indicative of at least one of:
a location of display of the additional image with respect to first image data frames;
a size of display of the additional image; and
a duration of display of the additional image.

14. The 3D source device of claim 8, wherein the first frame type identifier comprises a frame sequence number.

15. A 3D display device comprising:
a 3D display for displaying 3D image data;
an input interface circuit that receives a video stream, wherein the video stream comprises a plurality of sets of frames, wherein each set of frames of the plurality of sets of frames correspond to each 3D image in the 3D image data, and wherein each set of frames comprises:
an information frame, wherein the information frame comprises a frame type identifier; and
a 3D display signal, wherein the 3D display signal comprises a plurality of image data frames in a format corresponding to the frame type identifier;
a processor circuit, wherein the processor circuit processes each set of frames by repeatedly:
decoding each next information frame to determine a determined frame type identifier;
determining a determined format corresponding to the determined frame type identifier; and
decoding a next plurality of image data corresponding to a next 3D image in the determined format to provide a next 3D display image; and
an output interface circuit, wherein the output interface circuit communicates each next 3D display image to the 3D display;
wherein the plurality of sets of frames includes at least one set of frames that has a frame type identifier that differs from the frame type identifier of another set of frames,
wherein at least one frame type identifier comprises a frame sequence indicator, wherein the frame sequence indicator is indicative of a frequency of the corresponding image data frames comprising the 3D image.

16. The 3D display device of claim 15, wherein at least one frame type identifier comprises display parameters, wherein the display parameters affect the display of the 3D image.

17. The 3D display device of claim 15, wherein at least one frame type identifier comprises a main frame type identifier, wherein the main frame type identifier corresponds to the determined format and an additional frame type indicator, wherein the additional frame type indicator corresponds to an additional format, and wherein the corresponding set of frames include an additional display signal, and wherein the additional display signal comprises at least one additional image data frame corresponding to an additional image in the additional format corresponding to the additional frame type indicator.

18. The 3D display device of claim 17, wherein the additional image data frame comprises at least one of graphical information and subtitles.

19. The 3D display device of claim 17, wherein the additional frame type identifier includes display parameters, wherein the display parameters are indicative of at least one of:
a location of display of the additional image with respect to the image data frames;
a size of display of the additional image; and
a duration of display of the additional image.

20. The 3D display device of claim 15, wherein the frame sequence indicator is indicative of an order of the image data frames.

21. The 3D display device of claim 15, wherein at least one frame type identifier comprises a frame sequence number.

* * * * *